(12) United States Patent
Mayo et al.

(10) Patent No.: US 7,356,694 B2
(45) Date of Patent: Apr. 8, 2008

(54) SECURITY SESSION AUTHENTICATION SYSTEM AND METHOD

(75) Inventors: Mary Ann Mayo, Glendale, AZ (US);
Trey Neemann, Glendale, AZ (US);
Harry Pearson, Phoenix, AZ (US);
Chandra C. Sekhar, Tempe, AZ (US);
Dan Toraason, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 800 days.

(21) Appl. No.: 10/708,543

(22) Filed: Mar. 10, 2004

(65) Prior Publication Data

US 2005/0204148 A1 Sep. 15, 2005

(51) Int. Cl.
*G06F 9/00* (2006.01)
(52) U.S. Cl. ............... 713/159; 713/161; 713/164; 713/168; 713/172
(58) Field of Classification Search ........... 713/159, 713/161, 164, 168, 172
See application file for complete search history.

(56) References Cited

U.S. PATENT DOCUMENTS

| 5,485,455 A | * | 1/1996 | Dobbins et al. ........... 370/255 |
| 5,623,601 A | * | 4/1997 | Vu ............................. 726/12 |
| 5,720,035 A | * | 2/1998 | Allegre et al. ............. 709/225 |
| 5,805,803 A | | 9/1998 | Birrell et al. ................ 726/12 |

* cited by examiner

*Primary Examiner*—Thomas R. Peeso
(74) *Attorney, Agent, or Firm*—Fitzpatrick, Cella, Harper & Scinto

(57) ABSTRACT

Sharing of data between one domain and at least one other domain over a network is facilitated by the use of tokens. A user token set in a cookie stored on the user's system at log-on to a first domain is used to create, or is associated with, a secure token passed by a first domain to a second domain when the user, in a session with the second domain, requests resources, access to which includes authorization by a first domain. The secure token facilitates various actions pertinent to a user in a session with said second domain, including, for example, the maintenance of an active, concurrent session between a user and a first domain, and authentication and authorization without log-on at a second domain or other domains.

25 Claims, 7 Drawing Sheets

SECURITY SESSION AUTHENTICATION SYSTEM AND METHOD

FIELD OF INVENTION

The method and system of this invention generally relates to network communications, and more particularly, to facilitating the sharing of data between one domain and at least one other domain, by the use of tokens, to facilitate various actions pertinent to a user in a session with the other domain, including, for example, authentication, authorization, and the maintenance of an active, concurrent session over the network between a user and the first domain.

BACKGROUND OF INVENTION

It is increasingly common for transactions and services to be provided by electronic means. The conduct of such business to business and business to consumer transactions and the delivery of services is often facilitated by a user connecting to a host or server on the World Wide Web. In providing transactions and services to the user or client, the host may need to marshal resources, including applications and data, hosted at related servers or on third party servers. For example, an on-line store may offer a user the opportunity to browse and purchase products offered by multiple vendors. The store may need to display products and prices derived from such vendors' servers, process a purchase or sale transaction, and provide for payment and shipping. In accessing such resources, a connection is typically established with, or request made to, the server hosting the requested resource. Where the resource is partially or fully secure, it may be available only following log-on by the user and the establishment of a secure session with the server where the secure application or data resides. The log-on may provide authentication of the user and verification of the authorization of the user to access the requested resource. Log-on may be effected by supplying a user name and password which matches a user name and password previously established with the server hosting the resource, and sometimes additionally by the successful completion of a challenge query and a proper response sequence.

The requirement of sign-in, authentication, and authorization in order to obtain secure content may interrupt the perceived continuity of the session established between the user and the host. The user may be requested to engage in the authentication and authorization process multiple times, such as by logging-on, with the host and third party servers, in order to access applications and data. Each log-on may include a different user name or identification and password. The interruption of the session with the host, and the possible need to retain multiple user names and passwords, detracts from the user experience. Moreover, the session with one server may expire or time-out, thereby requiring the user to log-on again.

Methods exist to avoid multiple authentication and authorization steps by the user, while merging the functionality and resources of more than one site. Some such methods are referred to as "single sign-on" or SSO. Such methods generally include the use of a central authentication service which stores user identities and authorizations for various servers. The user typically logs-on once with the service, and may then access the applications and data for which authorization has been supplied by the service. The service may host the user session by providing a single log-on and negotiating for access to secure data with other web servers participating in the service. This solution to multiple user log-on is often complicated and expensive to deploy and maintain.

An example of single-sign-in methodology is Microsoft Corporation's Passport® single sign-in protocol, which provides users a means to sign-in to participating merchant web sites by signing-in and being authenticated only once to a common server. The Passport® protocol relies upon encrypted cookies set by the Passport® server. When a user begins a session with a merchant web site, the merchant web site re-directs the user to a Passport® server. The user logs-on with the Passport® server, and the Passport® server returns encrypted authentication information which is set as a cookie with the user system. Such authentication information can only be decrypted by the merchant web site. When the user returns to the merchant web site, the encrypted cookie is also returned to the merchant web site. The cookie is decrypted at the merchant web site and the user is verified as authenticated. The Passport® server also sets a cookie by which it can recognize the user as logged-in. Thus, if the user visits a second merchant web site, on re-direct to the Passport® server the Passport® server recognizes the user as already logged-in, and does not require another log-on, but returns authentication information that can only be decrypted by the second merchant web site, and redirects the user to that web site.

Current approaches to multiple authentication and authorization may include the sharing of confidential information about the user with the third party authentication service, and the necessity of updating such information on both the server owning the information and the third party server providing the authentication service. The placement of proprietary databases containing user information with a third party server also increases security risks.

Accordingly, a need exists for a less complicated and more cost effective way to address the requirement of sign-in, authentication, and authorization for multiple servers.

SUMMARY OF INVENTION

A method and apparatus facilitates the sharing of data between one domain and at least one other domain over a network, by the use of at least one token created by the first domain. The first domain and the other domain, herein referred to as the second domain, are capable of interactively communicating with each other. While in a session with the second domain, the user requests a resource, access to which is controlled or includes authorization by the first domain. The resource may be hosted at the second domain, the first domain or another domain, and which resource may be at least one of secure and non-secure. The second domain initially redirects the user request to the first domain, and the first domain authenticates the user, said authentication including at least determining whether the user has previously established a user session by logging-on with the first domain, and, if not logged-on, may requesting the user to log-on with the first domain; determining whether the user session is still valid, for instance, has not expired or timed out; and determining what resources the user is authorized or permitted to access.

The process of authenticating the user includes at least verifying the presence on the user system of a user token set by the first domain at the time the user logged-in to the first domain. If the user token is present, and the first domain determines the user token to be substantially authentic and valid, for instance, not expired or timed-out, and the user request to be within the authorization of the user established at log-on, the first domain uses the user token to create a secure token and places the secure token in a header to the first domain's response to the redirect of the user. The secure token may include a form of the user token, or may be created in some other manner that allows the secure token to be associated with the authenticated user in subsequent communications. The secure token may include designations of the resources the user is authorized to access and may also include other data, such as a time-out window. Further, the secure token may be obfuscated (e.g., made obscure or unclear), or may be encrypted.

The user is redirected from the first domain to the second domain, and the second domain places the secure token in a cookie with the user or the secure token could be a session cookie. The second domain may use the secure token to maintain the user's session with the first domain on behalf of the user, and to provide access to resources requested by the user. The user perceives a single session which is being managed across different domains and the user also perceives an uninterrupted session with the second domain. As such, the user may be unaware that the user's session with the first domain is concurrently maintained by the second domain, or of the location of resources requested.

The method of the invention facilitates the maintenance of a session between a user and at least two domains, such that a user may navigate among such domains without being required to log-on each time a domain is visited. Such session maintenance is accomplished without disclosing the contents of the tokens and cookies used to achieve that functionality, i.e., the method of the invention is not dependent on the second domain's capability to read the contents of the tokens and cookies used to maintain user sessions between the user, a first domain, and at least one second domain. The invention also allows a first domain to share selected resources with another domain without the necessity of storing such resources on a web server that the first domain does not control, and to control access to resources according to whether such resources are secure or non-secure.

BRIEF DESCRIPTION OF DRAWINGS

The accompanying drawings, wherein like reference numerals represent like elements, are incorporated in and constitute a part of this specification and, together with the description, explain the advantages and principles of the invention. In the drawings.

DETAILED DESCRIPTION

Figure 1:
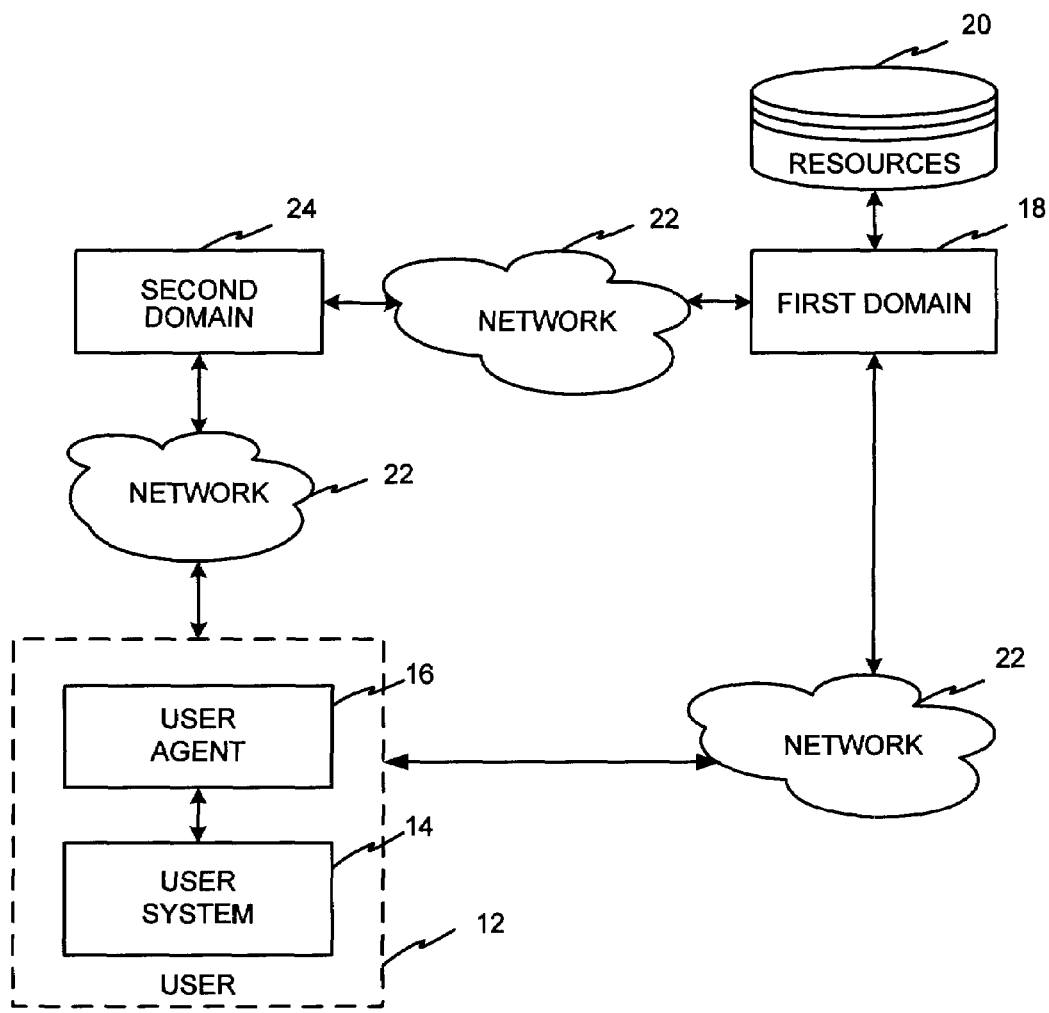
FIG. 1 is a block diagram of an exemplary system for maintaining multiple sessions over a network among a user, a first domain and a second domain.

Overview: The detailed description of embodiments of the invention herein makes reference to the accompanying drawings and figures, which show the embodiments by way of illustration and its best mode. Such embodiments are exemplary of numerous embodiments that may be made of the method of the invention. While these embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

The Internet is large network of computers and other devices that can communicate across a transmission medium. The computers and other devices may themselves be part of subnetworks. The documents, resources and other content available over the Internet are referred to as the World Wide Web. Web servers may store and disseminate such content in the form of web pages. A web page may represent text, graphics, animations, video, an executable file or other resources or content. Web servers and web pages are accessed by a user or client with agent software referred to as a "browser." Examples of browsers for use with personal computers include Netscape Navigator®, Internet Explorer®, Opera® and Mozilla®. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. A web server may include a web service which receives a request from a web server, the request including a URL (http://yahoo.com/stockquotes/ge) and an IP address (123.56.789). The web service server retrieves the appropriate web pages and serves data and applications for web pages to the IP address.

Each computer or other device on a network has an address or identifier for purposes of routing or addressing messages or data packets known as an IP address. All resources and content on the World Wide Web have a Uniform Resource Identifier or URI. The Uniform Resource Locator or URL is a type of URI, and is the global address of resources and content on the World Wide Web. The URL identifies the IP address where a particular resource or content is located and the means or protocol that must be used to access the resource or content, such as HTTP or FTP. Since IP addresses are stated in numbers, for ease of reference, one or more IP addresses may be identified by an alphanumeric domain name. Web sites are locations on the World Wide Web, and typically include a collection of linked or interconnected web pages. The rules and conventions which govern the assignment of IP address, URI's, URL's, and domain names are well known in the art.

The computers and other devices on the Internet exchange messages or communicate using a protocol. Protocols govern logical addressing, routing, name service, error control, flow control, and application support. The protocol for Internet communications in general use today is TCP/IP, which is an acronym for Transmission Control Protocol and Internet Protocol. TCP governs how two computers on a network establish a connection and exchange packets of data. IP governs how the data is segmented into packets. Another protocol sometimes used is UDP or User Datagram Protocol.

The principal protocol used by the World Wide Web is HTTP or HyperText Transfer Protocol. HTTP establishes rules for communication between two computers on the Internet, defining how messages are formatted and transmitted, and what actions clients and servers may initiate and how they may respond. It is typically based on a client-server architecture and a request-response paradigm. That is, one computer, referred to as the client, opens communication with another computer, referred to as the host, by sending a request, to which the other computer, referred to as the server, replies by sending a response. Both the format and content of the request and the response must conform to the HTTP protocol. For example, entering a URI in a browser sends an HTTP <<GET>> request to the server for the web page located at the URI. If the URI is valid and the request is not unauthorized, the server transmits the requested web page.

Additional information is contained in HTTP request-response messages and headers. For example, the message headers typically identify the URL from which the message originates, the type, version, and capabilities of the browser being used and the date, size, and type of data being sent. Additional headers may specify caching directives, the expiration or maximum age of the message, and other parameters.

Each request-response pair is complete and independent of every other request-response pair. After responding to the client request, the server terminates the connection with the client. For that reason, HTTP is called a "connectionless" protocol. Moreover, the server does not track prior connections or maintain a record of the "state" or the status or condition of each connection, so each new request is received and processed without the context of such communications. For this reason, HTTP is said not to maintain state, and HTTP sessions are called "stateless."

To get around the problem of maintaining an active connection or session using a protocol that is stateless, information about the connection and messages exchanged may be included in a file stored by the client, sometimes called a cookie. A cookie may be persistent, which comprises a cookie stored on the user system which is retained notwithstanding the user exiting the browser or restarting the user system. Another type of cookie, called a session cookie, comprises a temporary record of settings and preferences relating to the navigation of a web site by a user, which cookie is deleted when the user exits the browser. The state information contained in a session cookie is returned to the web server in the next request, and the web server can send a response taking that state information into account. To the user, the session appears to be continuously active, and is sometimes called "stateful," and session cookies are a means of managing session state.

Cookies generally are specific to the domain of the server which sent the data to the client, and the contents of cookies are typically not available to servers outside the domain of the server setting the cookie. Cookie content may include user identification and password information, user preferences, browsing history, transaction history associated with the user, and the range of URL's to which the cookie is accessible. Cookies and their contents may be in clear text, or encrypted or obfuscated in whole or in part. Any method of encryption or obfuscation may be employed. For example, DES, triple-DES and public-private key systems are commonly used encryption means. Cookies may be temporary, meaning they are deleted when the browsing session ends, or persistent, meaning they are stored on the user system and not deleted when a browsing session ends.

The request to store information in a cookie on the client, the content and format of that information, and the manner and extent to which such information is used by the user agent or browser and included in an HTTP request header, is generally governed by established conventions or rules. Those most applicable to HTTP sessions and to cookies are published by the IETF as Requests for Comment Nos. 2616 ("Hypertext Transfer Protocol HTTP/1.1") and 2965 ("HTTP State Management Mechanism"). The referenced texts are hereby incorporated by reference.

The exchange of confidential, proprietary or "secure" content between a client and a server may be accomplished using various security protocols. A security protocol encrypts and decrypts messages transmitted over a network, and may provide authentication of authorized recipients. Common security protocols used for Internet communications include Secure Sockets Layer or SSL, Secure HTTP or SHTTP, Private Communications Technology or PCT, IP Security or Ipsec, and Transport Layer Security or TLS. SSL is in common use and is invoked by the "https" preface in a domain name or URL. SSL provides data encryption using private key encryption technology. Where a client engages in a secure session with a server, headers in the request-response messages exchanged may specify a secure protocol, and convey state information, such as the identity of the client and the authorizations or permissions applicable to the client, i.e., what secure content may be sent in a response to a client request. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Embodiments consistent with the invention are capable of maintaining a concurrent session between a user system and a first domain (e.g., web server), which session may be secure or non-secure, while the user is in a session with at least one second domain, which session may also be secure or non-secure, wherein resources requested by the user system, access to which includes authorization by the first domain, may be provided to the user system without requiring the user to log-on with both the first domain and the second domain, whether or not the resources are hosted at the first domain or the second domain. Typically, if there is a session to be managed, the first domain session is secure since there most likely was some type of login. In other words, if the first domain is not secure, then there really may not be a session to be maintained between the domains. Logically, it still appears there is one site, but the two domains may not be communicating as set forth herein. As such, if the user makes a request for some protected resource from the first domain, then the first domain will demand a login first.

Maintaining a concurrent session is accomplished by using a secure token, which secure token is set by the first domain in the header of a response to a redirect of the user from the second domain to the first domain. The secure token is extracted from the response header, and placed by the second domain in a cookie (e.g., session cookie) with the user system. The secure token is attached to subsequent user requests made to the second first domain from the second domain. The secure token is used by the second domain to maintain an active user session with the first domain and to display the resource requested, using first domain web services that have been made available to the second domain. As one of ordinary skill will recognize, the term "display" includes access to any type of resource, including data and applications. In an embodiment, the first domain encrypts the user token set when the user logs in with the first domain, and places the encrypted user token as the secure token in the response header redirecting the user to the second domain. When the secure token is used by the second domain to maintain an active user session with the first domain, or in a request for a resource, where access to such resource includes authorization by the first domain, the first domain decrypts and may then authenticate the secure token as the user token previously set by the first domain, and thereby confirm user authorizations or permissions to access the resource requested. When making the session anonymous, in one embodiment, the second domain nulls out the secure token that is present.

In an exemplary embodiment, the user token may not be encrypted and used as the secure token, but the secure token may be derived from the user token or established by some other means and associated or linked with the user token. The second domain may then further obfuscate the secure token.

In one embodiment, log-on, authentication and authorization are managed by processes or services available to the first domain, also known as components or modules, as is the creation of the user token, its encryption and placement as the secure token, and its inclusion in the response header. The creation, populating and management of headers and cookies and the content of headers and cookies is also managed by services called by each of the first domain and second domain. The further obfuscation of the secure token and its use in cookies and headers is managed by the second domain.

The maintenance of a user session with and access to resources hosted at the first domain is facilitated by providing the second domain with the capability of exchanging messages or calls with certain web services at the first domain. For example, the second domain might communicate a request to the first domain web service providing the functionality of validating user requests for resources. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise" (2003), hereby incorporated herein by reference.

Exemplary embodiments of the invention include facilitating the merger of the functionality of an on-line store spanning multiple merchant web sites using a pre-paid or on-line wallet service, or providing a means to combine resources from multiple airline, auto rental, hotel and other services web sites to produce a consolidated itinerary, or allowing for the redemption of points awarded in various merchant loyalty programs such as those offered by credit card companies, at third party web sites other than the web site of the merchant maintaining the point balance.

Exemplary embodiments of the invention also include a system for maintaining concurrent sessions over a network among a user, a first domain and at least one other domain, referred to herein as the second domain. Communication between the user system, first domain, and/or second domain may be accomplished through any suitable communication means, such as, for example, a telephone network, intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption, compression, decompression, and/or the like.

The computers discussed herein may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system.

In the embodiment shown in FIG. 1, the system 10 includes a user 12, comprised of at least a user system 14 and a user agent 16, a first domain 18, a second domain 24, and resources 20 hosted at the first domain 18. The user system 14 and the second domain 24 are connected by means of the user agent 16 and a network 22. The user system 14 and the first domain 18 are also connected by means of the user agent 16 and a network 22. The second domain 24 and the first domain 18 are connected by a network 22.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The user system 14 may be any software, hardware, person, entity, and/or electronic agent for a natural person or a business entity. The user system 14 establishes a connection over a network 22 with the second domain 24 and the first domain 18 by means of the user agent 16. The user agent 16 may be any hardware and/or software configured for communicating over a network 22, including a computer and a personal digital assistant, and a network connection. The user agent 16 can be in a home or business environment. In one embodiment, access to the network 22 is via the Internet through a commercially-available web-browser software package. The user system 14 may interface with the user agent 16 by various means. The user system 14 and the user agent 16 may be collectively referred to as a user or client.

In use, the relationship between the user and the second domain 24 or the first domain 18 is called a session. Upon establishing a session between the user system 14 and the second domain 24 or first domain 18, the user is in communication with the web server for such domain via a network 22. The network can include any wireline or wireless network for data transmission such as, for example, a TCP/IP network. While the system 10 will be described herein with respect to an Internet connection and the protocols associated therewith, one skilled in the art will appreciate that any network connection or protocol now known or hereafter developed may also be used in the present invention.

The system 10 may be suitably coupled to network 22 via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., Gilbert Held, "Understanding Data Communications" (1996), hereby incorporated by reference.

System 10 also includes a second domain 24 and a first domain 18. Each domain includes at least one web server and may include multiple interconnected computing systems sharing a common domain name, and a particular request in a session with the user may be routed to any available computing system comprising the domain. The computing systems may include a processor for processing digital data, a memory coupled to said processor for storing digital data, an input device coupled to the processor 42 for inputting data, an application program stored in said memory and accessible by said processor for directing processing of data by said processor, a display coupled to the processor and memory for displaying information derived from data processed by said processor and a plurality of databases, said databases including client data, merchant data, financial institution data and/or like data that could be used in association with the present invention. As those skilled in the art will appreciate, the computer will typically include an operating system (e.g., Windows NT, 95/98/2000, Linux, Solaris, etc.), and various application and support software and drivers typically associated with computers. Such application and support software may include components that provide discrete functionality and have well-defined interfaces. For example, such components might retain information concerning the state of a user session, or provide authentication and authorization services, or display requested resources following valid authentication and authorization.

In an embodiment as described herein, the second domain serves as the host or primary connection with the user. Whether the user established the session with the second domain directly, by a hyperlink from another domain or by some other means is not material to the invention. Typically, the user establishes a session with the second domain to transact business or to obtain information or services. For example, the second domain may be an on-line store, and the user connects to the second domain for purposes of searching and possibly purchasing goods or services.

System also includes a first domain. The first domain controls access to resources, which may be stored at the first domain, or the first domain may serve as a conduit or gateway to a repository where such content is stored. For example, the first domain may provide access to credit information personal to the user, or to the balance of a pre-paid account which may be used to make purchases, or to the balance of points or tokens that may be redeemed for goods or services.

Resources may include text, graphics, animations, video, an executable file and/or any other data, content or resource. Resources so hosted may or may not be stored at the first domain, but may be stored at other locations and accessed through the first domain by a network or other means. In addition, content may be secure, e.g., accessible only by authorized persons in secure sessions, or non-secure, e.g., accessible by anyone in non-secure sessions. An example of a secure resource might include the balance of a user's credit card account, or a transaction history for such account. An example of a non-secure resource may be a list or other presentation of goods for purchase, as might be displayed at the website of an online merchant.

One skilled in the art will also appreciate that any databases, systems, or components of the present invention may include any combination of databases or components at a single location or at multiple locations, wherein each database or system includes any of various suitable security features, such as firewalls, access codes, encryption, de-encryption, compression, decompression, and/or the like. Any databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The first domain and the second domain interactively connected at least in that the second domain may access certain services and resources hosted at the first domain using previously established interfaces and protocols. One skilled in the art will recognize that such interfaces and protocols may take many forms, and may include something as basic as web services or an HTML based form populated by the second server that is accessed via the Internet, or a proprietary scripting language.

Figure 2:
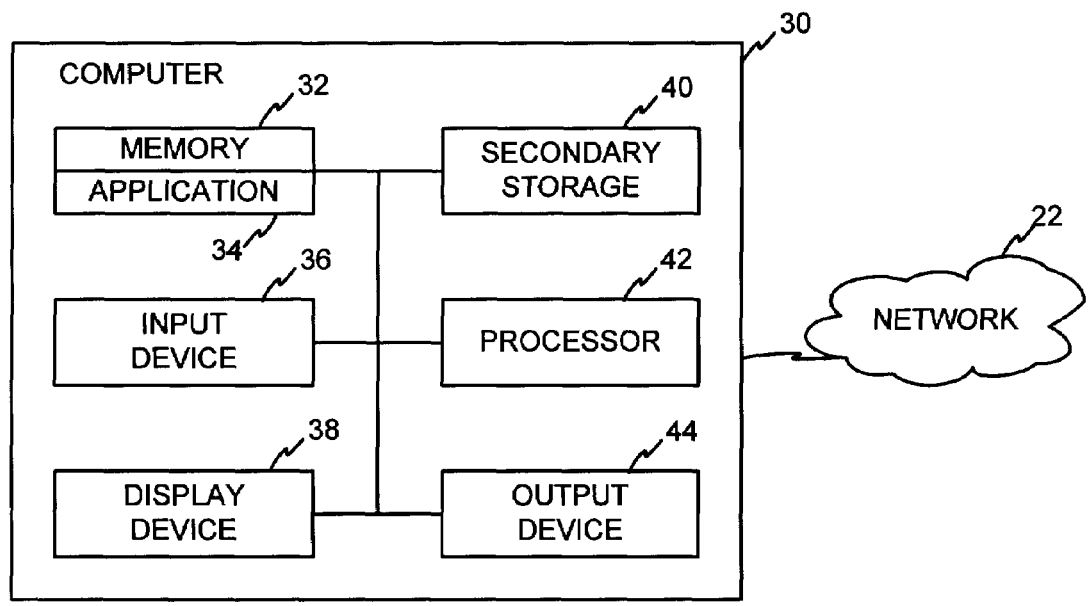
FIG. 2 is a block diagram of exemplary components of a computer and a server.

FIG. 2 is a block diagram of an exemplary computer 30 illustrating typical components of a user system 24 or a web server or other computer that is a component of the first domain 18 or the second domain 24. Computer 30 can include a connection with a network 22 such as, for example, the Internet through any suitable network connection. Computer 30 typically includes a memory 32, a secondary storage device 40, a processor 42, an input device 36 for entering information into computer 30, a display device 38 for providing a visual display of information, and an output device 44 for outputting information such as in hard copy or audio form.

Memory 32 may include random access memory (RAM) or similar types of memory, and it may store one or more applications 34 for execution by processor 42. Secondary storage device 40 may include a hard disk drive, floppy disk drive, CD-ROM drive, or other types of non-volatile data storage. Processor 42 may execute applications or programs stored in memory 34 or secondary storage 40, or received from the Internet or other network 16. Although computer 30 is depicted with various components, one skilled in the art will appreciate that the server and agent computers can contain different components.

As described herein, the computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the user may employ a computer and modem to occasionally connect to the Internet, whereas the web server computers might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete", various authors, (Sybex 1999); Deborah Ray and Eric Ray, "Mastering HTML 4.0" (1997); Loshin, "TCP/IP Clearly Explained" (1997); and David Gourley and Brian Totty, "HTTP, The Definitive Guide" (2002). All of these texts are hereby incorporated by reference.

The systems may be suitably coupled to a network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Any of the computers might also reside within a local area network (LAN) which interfaces to network via a leased line (T1, D3, etc.). Such communication methods are well known in the art, and are covered in a variety of standard texts. See, e.g., Gilbert Held, "Understanding Data Communications" (1996), hereby incorporated by reference.

Embodiments of invention may be described herein in terms of functional block components, optional selections and various processing steps. It should be appreciated that such functional blocks may be realized by any number of hardware and/or software components configured to perform the specified functions. For example, embodiments of the invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that embodiments of the invention may employ any number of conventional techniques for data transmission, signaling, data processing, network control, and the like.

Many applications of embodiments of the invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although embodiments of the invention are frequently described herein as being implemented with TCP/IP communications protocols, it will be readily understood that such embodiments could also be implemented using IPX, Appletalk, IP6, NetBIOS, OSI or any number of existing or future protocols.

Figure 3A:
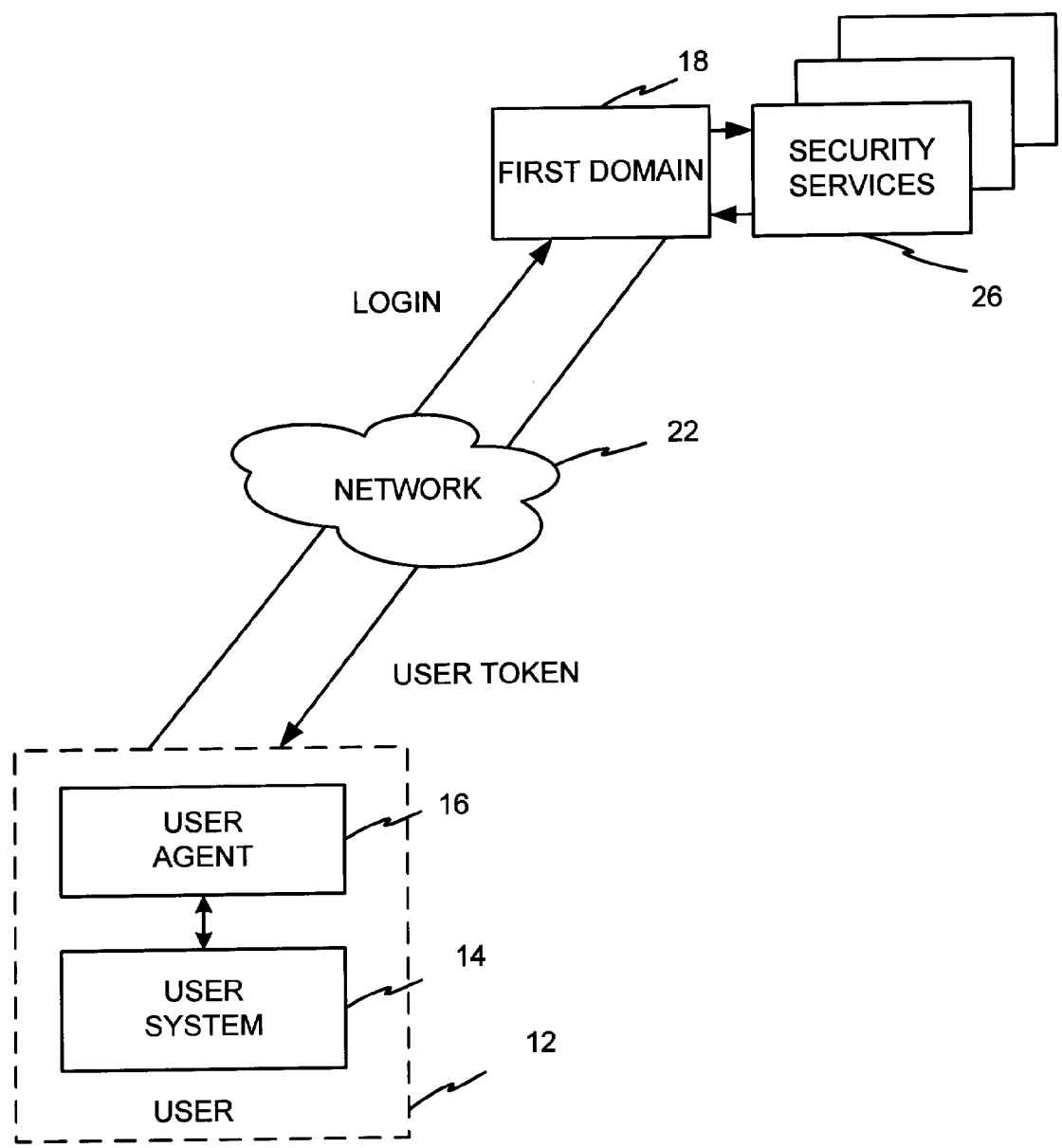
FIG. 3A is a block diagram of an exemplary system for setting a user token.

FIG. 3A is a block diagram of an exemplary system 10 by which a user logs on to the first domain 18. A session is established via the network between the user system 14 and the first domain 18. The user log-on to the first domain 18 is managed by a login service 24. The login service 24 may include more than one application residing on one or more web servers or computers in the first domain 18. The login service 24 authenticates or verifies the identity of the user and returns a user token or tag in the response header disclosing the state of the user session with the first domain as logged-in. The user token or tag is preserved by the user agent 16 as a cookie. Additional information concerning the user, such as the nature or types of resources that the user is authorized or permitted to access, may also be disclosed in a similar fashion. However, in certain embodiments, user information is not available to the second domain; rather, the second domain receives the secure token and the second domain uses the secure token as a key to facilitate access to information, while having minimal or no access or information related to the resources within the first domain.

Figure 3B:
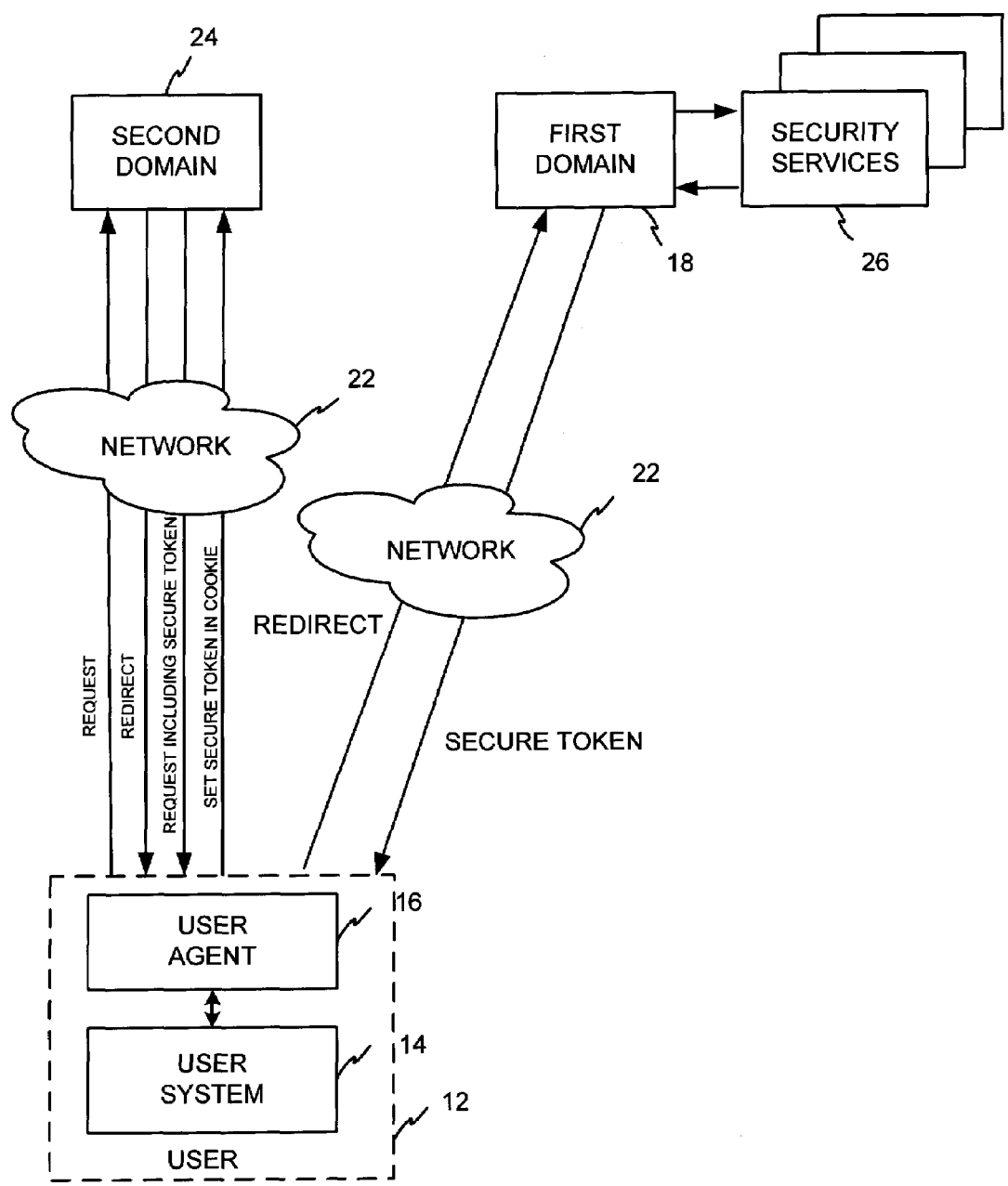
FIG. 3B is a block diagram of an exemplary system for setting a secure token.

FIG. 3B is a block diagram of an exemplary system by which a secure token is set. A session is established via the network 22 between the user and the second domain 24. The user initiates a request at the second domain 24. For purposes of FIG. 3B, the user has logged on to the first domain 18 prior to such request. The user token is included in the user request header by the user agent 16. The user request is redirected to the first domain 18 for purposes of authentication. In the embodiment illustrated, the first domain 18 authenticates the user by validating the user token which was set on the user system at the time of the prior user log-on. The authentication process is managed by a security service 26. The security service 26 may include at least one application residing on one or more web servers or computers in the first domain 18. The security service 26 confirms that the state of the user session is logged-on to the first domain 18. The security service 26 may comprise further logic that causes the expiration of the logged-on status if, for example, the elapsed time between the initial log-on by the user and the request to authenticate the logged-on status of the user exceeds a predetermined value.

For purposes of FIG. 3B, the user has logged-on and such logged-on status is valid. The security service 26 encrypts the user/session credential to create a secure token, then returns a secure token or tag in the response header disclosing the state of the user session with the first domain 18 as logged-on. The secure token is included in a response header sent by the first domain 24 to the user system 14, and is set by the second domain in a cookie on the user system. Additional information concerning the user, such as the nature or types of resources that the user is authorized or permitted to access, may also be disclosed in a similar fashion. The presence of the secure token in the cookie set by the second domain defines a session and the session identifies the user and establishes the resources which the user is authorized to access, and which the second domain is authorized to display to the user.

Figure 3C:
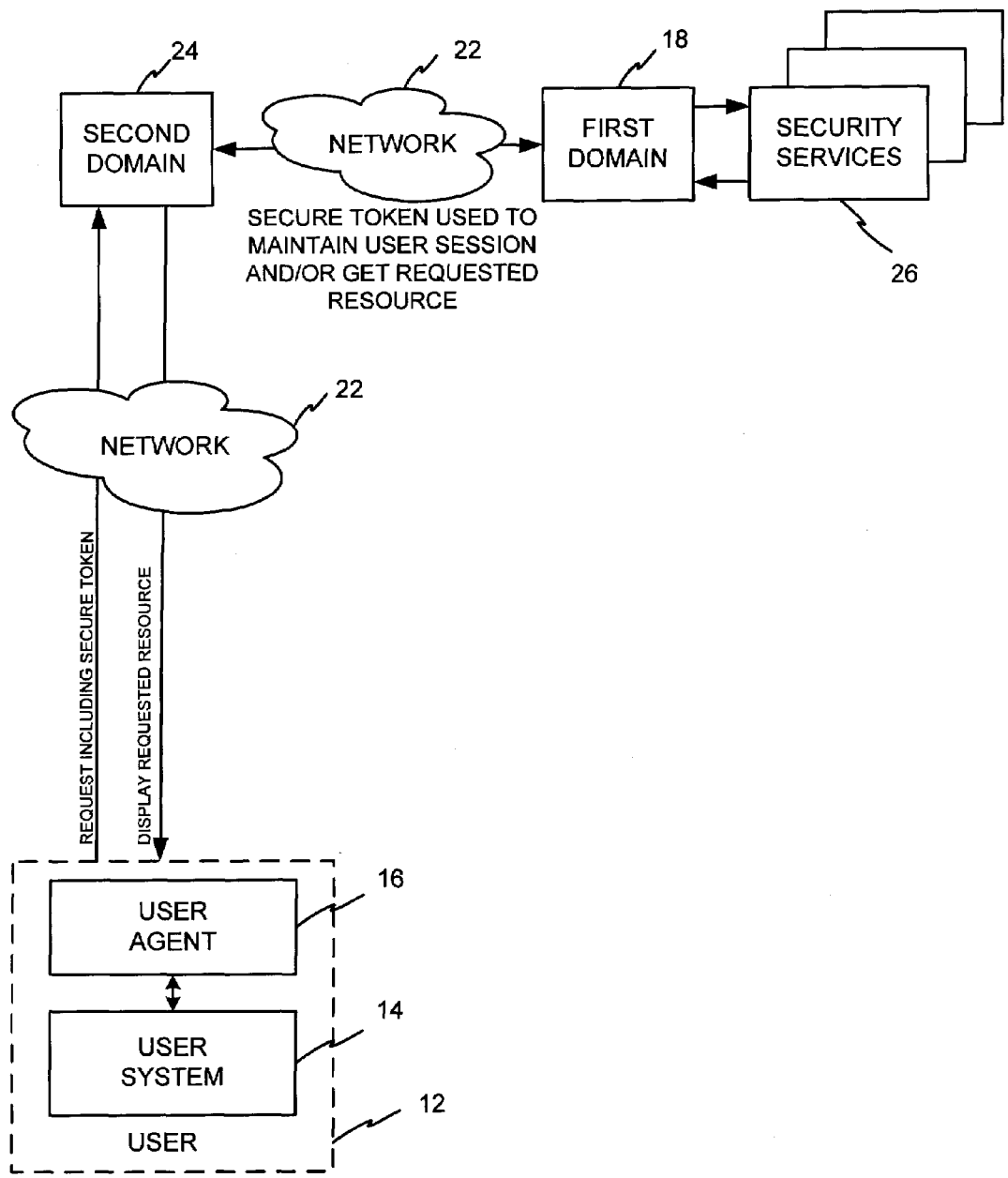
FIG. 3C is a block diagram of an exemplary system for using a secure token.

FIG. 3C is a block diagram of an exemplary system by which a secure token is used to retrieve user information from the first domain 18 fromby the second domain 24. As the user browses the second domain 24, the user system 14 initiates multiple requests directed to the second domain. The requests include information set by the second domain 24 and stored as cookies by the user agent 16 in response to a <<SET COOKIE>> command initiated by the second domain 24, such as the secure token. When the second domain 24 receives such requests, it uses the secure token returned in the user request in a communication with the security service 26 component of the first domain 18. The communication may be a request to maintain the state of the user session with the first domain 18 as logged-on or active, or to display resources requested by the user system 14. The security service 26 at least authenticates the second server 16 as an authorized origin for such communication, verifies and authenticates the secure token present in the communication, and updates the state of the user session, authorizes the data to be acquired by the second domain and displayed again by the second domain, or both, depending on the validity of the communication and secure token.

Figure 4:
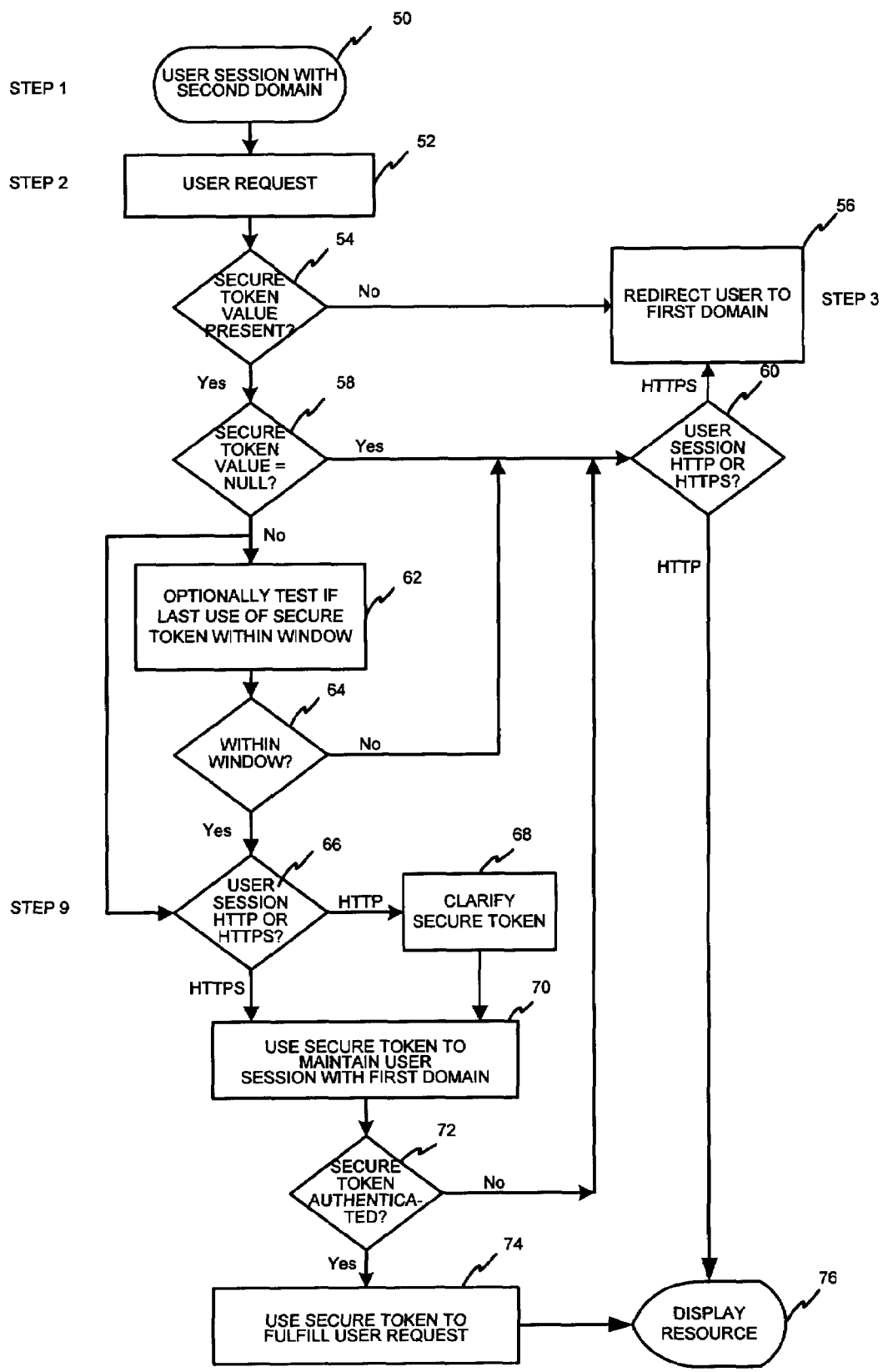
FIG. 4 is a flow diagram of an exemplary method for using the secure token to maintain concurrent sessions over a network among a user, a first domain and a second domain.

With reference to FIGS. 1 and 4, the invention includes an exemplary method for using the secure token to maintain concurrent sessions over a network 22 among a user, a first domain 18 and a second domain 24. The method can be implemented in, for example, hardware and/or software modules for execution by a computer. In one embodiment, a user, in a session with the second domain 24, requests a resource. (Step 1) The user may establish the session with the second domain 24 by any means, including directly requesting the connection to the second domain 24 by entering its URL in a browser, or indirectly by referral or hyperlink from another URL. The user session may be one of secure or non-secure, which in the embodiment illustrated in FIG. 4 is, for example, HTTPS or HTTP, respectively. The user request is transmitted by the user agent 16 to the second domain 24 via a network. As indicated above, this request can originate from a variety of computers or other devices via any communications network. The user agent 16 prepares and formats the user request according to the protocol established for communicating with the second domain 24, which is one of non-secure or secure. The user request header created by the user agent 16 typically identifies whether the session is conducted using a non-secure protocol, such as HTTP, and is therefore a non-secure session, or whether the session is conducted using a secure protocol, such as HTTPS, and is therefore a secure session. Data from cookies, such as tokens or tags, may also be included by the user agent 16 in the user request header.

The user request is received by the second domain and processed 54, and, depending on the presence and value of a secure token in the user requestuser's response header, the second domain takes certain actions respecting the user request, such as maintaining the state of the user session with the second domain as logged-on or active, obtaining the resource requested by the user, or directing the user to log in with the first domain. (Step 2)

In the embodiment illustrated, the second domain checks for the presence and value of the secure token 54. In one embodiment, during the user's initial request to the second domain, the second domain also determines from the user request header whether the user session is non-secure or secure 66; however, the type of session may be determined at other points in the process.

If the secure token is not present in the cookie set by the second domain, the user system is redirected to the second first domain for authentication or log-on 56. (Step 3)

If the secure token is present in the user cookie and has no value (i.e., no value) 58, and the user request is for a non-secure resource that may be displayed in a non-secure (e.g., HTTP) session 60, the resource requested will be displayed to the user 76.

If the secure token is present in the user cookie and has no value 58, and the user request is for a secure resource that may be displayed only in a secure (e.g., HTTPS) session 60, the user will be redirected to first domain 56 to log-in. (Step 3)

If the secure token is present in the user cookie and has a value 58, then the second domain will substantially determine when the secure token was last used to refresh, keep alive or maintain the session state between the user and the first domain as logged-on or active 64. In one embodiment, this may be accomplished by a request to maintain the session as logged-on or active 70, herein called a "keep alive" web service request, in which the secure token is included, made by the second domain to the first domain. (Step 9). The second domain will clarify the obfuscated security token If the secure token has been obfuscated by the second domain, the second domain will clarify the secure token and include it in the keep-alive request 70 (de-obfuscating the secure token may also applicable in other embodiments and steps, such as, for example, acquiring a secure resource). The keep-alive request is processed by an application service at the first domain, which, among other steps, substantially determines whether the keep-alive request originated from a domain authorized to make such requests and whether the secure token included in the request is valid 72. In addition to a keep alive request, in one embodiment, the system may include a secure token which fulfills the user request by displaying the requested resource 74.

The present invention may include two methods for managing the session between the domains. As an initial matter, active requests for resources from the second domain to the first domain reset the session period. In one embodiment for managing the session timer, as described, an application timer is used to determine when an explicit request to reset the session timer is made from the second domain. In another embodiment, an explicit request is made for every page requested by the user from the second domain. In other words, instead of using a timer to know when to reset the session, a reset is simply made for every page for the user session. This embodiment may be seamless because it is the method for managing the session on the first domain.

The frequency of keep-alive requests may be mitigated by employing the following additional steps separately or in combination 64. For example, where the time elapsed since the last such use exceeds a pre-set value, the user session with the first domain will be deemed to have expired and the user will be directed to the first domain to log-on and establish another session 56. If the time elapsed since the last such use does not exceed the preset value, the second domain will make a keep-alive request to the first domain and include the secure token in such request 70, and fulfill the user request 74 by displaying the resource requested 76. Optionally, as a means to balance keep-alive requests, the second domain may make such requests only where the elapsed time since the last such request is within a pre-defined window. For example, where the elapsed time is greater than some minimum below which the likelihood of the session between the user and the first domain having expired is low, the second domain may omit the step of using the secure token to refresh, keep-alive or maintain an active user session, and use the secure token to fulfill the user request by displaying the requested resource.

If the secure token used by the second domain in a keep-alive request or in displaying the requested resource is not accepted by the first domain security service, the user is re-directed to the first domain to log-on, if the resource being requested is secure (e.g., HTTPS).

The exemplary logic of the second domain in processing the user request may be represented in tabular form as a function of the presence or absence of the secure token, the value of the secure token if present, the type of session requested, i.e., secure or non-secure, and the time elapsed since the last call to the security web service to maintain an active user session with the first domain. When making the session anonymous with a non-secure resource, in one embodiment, the second domain nulls out the secure token that is present. Moreover, to trigger the refresh, the invention establishes a discrete session maximum and a refresh minimum threshold.

| Secure Token | Value | HTTP/S | Last Use | Action |
|---|---|---|---|---|
| Not present | — | — | — | Redirect to first domain |
| Present | No value | HTTP | — | Display resource |
| Present | No value | HTTPS | — | Redirect to first domain |
| Present | ≠No value | HTTP | >10 min. | Display Resource, make session anonymous |
| Present | ≠No value | HTTPS | >10 min. | Redirect to first domain |
| Present | ≠No value | — | <10 min. | Maximum session time |
| | | | >8 min. | Refresh session minimum, display resource |
| Present | ≠No value | — | ≤8 min. | Display resource |

Figure 5:
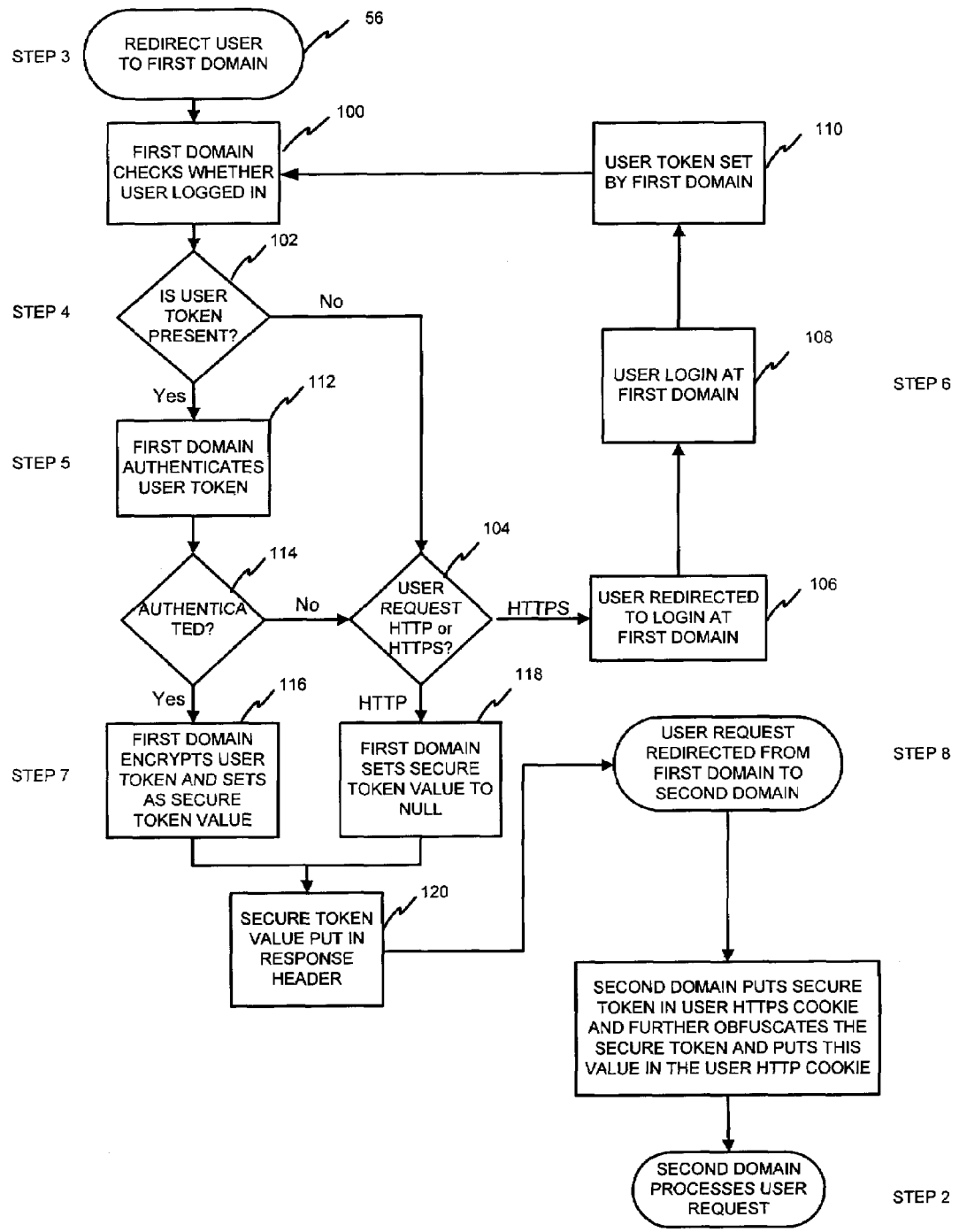
FIG. 5 is a flow diagram of an exemplary method for setting the secure token.

FIG. 5 is a flow diagram of an exemplary method for setting the secure token. The secure token is set by the first domain following redirect by the second domain of a user request for a resource controlled by or accessed through the first second domain 56. (Step 3) The secure token is then placed in the response header to the redirect of the user request from the second domain back to the first domain. (Step 7)

In an exemplary method, upon redirect of the user request 56, the first domain first substantially determines whether the user has already logged-on to the first domain 100. This is accomplished by checking for the presence of the user token set by the first domain at user logon 102 and authenticating the user token if present 114. (Step 4) The authenticating step is managed by an application service.

If the user token is not present, or if the user token is present but is not valid, and the user request is for a non-secure resource 104, the secure token is created and its value is set at no value 110. (Step 4) The no value secure token is included in the response header to the redirect of the user request from the second domain 112.

If the user token is not present or if the user token is present but is not valid, and the user request is for a secure resource, the user is directed to log-on at the first domain 106. The log-on is managed by an application service. Upon successful log-on 108, the first domain sets a user token in a cookie 110, and the user restarts the authentication step 100.

If the user token is present, then the first domain will attempt to authenticate the user token using the security service 114. (Step 5) The security service may, among other steps, compare the user token present with the user token that was set by the first domain on user log-on. If the user token is present and is authenticated by the first domain, the first domain will set a secure token in the response header to the redirect of the user request from the second domain. In the exemplary embodiment, the user token is encrypted and set as the value of the secure token 118. (Step 7) Use of an encrypted value for the secure token may provide some protection against a compromise of session security, for example, by spoofing the first domain header information.

The actions taken by the first domain in setting the secure token can be represented in a table as a function of the presence and validity of a user token, and the type of resource requested, i.e., non-secure or secure (HTTP or HTTPS, respectively).

| User Token | Valid | HTTP/S | Action |
|---|---|---|---|
| Not present | — | HTTP | Secure token value set to no value |
| Not present | — | HTTPS | User directed to log-on; Encrypted user token set as secure token value |
| Present | No | HTTP | Secure token value set to no value |
| Present | No | HTTPS | User directed to log-on; Encrypted user token set as secure token value |
| Present | Yes | — | Encrypted user token set as secure token value |

The second domain receives the response from the first web domain to the redirect of the user request from the second domain 120, parses the response header, and uses the secure token included therein as the secure token value to be set in a secure (e.g., HTTPS) cookie and obfuscates the secure token and places that value in a non-secure (e.g., HTTP) cookie with the user agent for use when resources from the first domain are needed. (Step 8)

In one embodiment, the system may trigger the second domain when to refresh itself against the first domain (e.g., to avoid an arbitrary refresh) when it knows that there have been changes of interest for the second domain. In requests from the user to the second domain, the user agent will include the secure token contained in the session cookie set by the second domain in the request header. In another exemplary embodiment, instead of or in addition to the second domain checking whether it has a secure token, the second domain may check (e.g., each time) the first domain for an active token. As such, if an event occurred since the time when the second domain acquired the secure token, the next time any action occurs on the second domain, the new event is available to the second domain.

While the methods disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

The invention claimed is:

1. A method for facilitating the sharing of data pertinent to a user system between a first domain and a second domain, wherein said second domain is in a session with said user system, the method comprising:
    establishing a network session between said user system and said second domain, wherein said session is at least one of secure or non-secure, and wherein said second domain and said first domain are configured to interactively communicate with each other;
    receiving a request from said user system to said second domain for a resource, wherein access to said resource includes authorization by said first domain;
    determining the presence of at least one secure token in a cookie set by said second domain on said user system, wherein said secure token originates with said first domain and relates at least to an authorization of said user system to access said resource;
    determining the validity of said secure token, if said secure token is present;
    redirecting said request to said first domain, if said secure token is not present; and
    if said secure token is present, and is valid, incorporating said secure token in a request to said first domain to keep the state of the session between said user system and said first domain as active.

2. The method of claim 1, wherein said secure token is encrypted, and is clarified by at least one of said first domain and second domain prior to its use in said request to maintain the session between said user system and said first domain.

3. The method of claim 1, wherein said secure token is obfuscated, and is clarified by at least one of said first domain and second domain prior to its use in said request to maintain the session between said user system and said first domain.

4. The method of claim 1, further comprising determining an elapsed time since the prior use of said secure token in said request to maintain the session between said user system and said first domain, and if such elapsed time is greater than a pre-defined threshold, redirecting said user system to said first domain.

5. The method of claim 1, further comprising using said secure token, if such secure token is present, and is valid, to fulfill said request made by said user system for said resource.

6. The method of claim 1, further comprising determining whether said request made by said user system is for a secure or a non-secure resource, and if said request is for a non-secure resource, fulfilling said request.

7. A computer system for facilitating the sharing of data pertinent to a user system between a first domain and a second domain, wherein said second domain is in a session with said user system, comprising:
    a module configured to establish a network session between said user system and said second domain, wherein said session is at least one of secure or non-secure;
    a module configured to establish interactive communication between said first domain and said second domain;
    a module configured to receive a request made by said user system to said second domain for a resource, wherein access to said resource includes authorization by said first domain;
    a module configured to substantially determine the presence of at least one secure token in a cookie set by said second domain on said user system, wherein said secure token originates with said first domain and relates at least to an authorization of said user system to access said resource;
    a module configured to substantially determine the validity of said secure token, if said secure token is present;
    a module configured to redirect said request to said first domain, if said secure token is not present; and
    if said secure token is present, and is valid, a module configured to use said secure token in a request to said first domain to keep the state of the session between said user system and said first domain as active.

8. The system of claim 7, further comprising a module to clarify said secure token, where said secure token is obfuscated, prior to its use in said request to said first domain to keep the state of the session between said user system and said first domain as active.

9. The system of claim 7, further comprising a module to decrypt said secure token, where said secure token is encrypted, prior to its use in said request to said first domain to keep the state of the session between said user system and said first domain as active.

10. The system of claim 7, further comprising a module configured to substantially determine an elapsed time since the prior use of said secure token in said request to said first domain to keep the state of the session between said user system and said first domain as active, and if such elapsed time is greater than a pre-defined threshold, to redirect said user system to said first domain.

11. The system of claim 7, further comprising a module configured to use said secure token, if such secure token is present, and is valid, to fulfill said request for said resource.

12. The system of claim 7, further comprising a module configured to substantially determine whether said request is for a secure or a non-secure resource, and if said request is for a non-secure resource, fulfilling said request.

13. A method for facilitating the sharing of data pertinent to a user system between a first domain and a second domain, wherein said second domain is in a session with said user system, the method comprising:
    establishing a network session between said user system and said second domain, wherein said session is at least one of secure or non-secure, and wherein said second domain and said first domain are configured to interactively communicate with each other;
    receiving, on redirect from said second domain, a request made by said user system to said second domain for a resource, wherein access to said resource includes authorization by said first domain;
    determining the presence of at least one user token in a cookie set by said first domain on said user system, wherein said user token originates with said first domain and relates at least to a log-on of said user system to said first domain;

determining the validity of said user token, if said user token is present;

if said user token is at least one of not present and not valid, said user system logging-on, and, upon valid log-on, setting a user token in a cookie on said user system, which user token relates at least to said log-on; and if said user token is present, and said user token is valid, including a secure token in said first domain response to said redirect from said second domain, wherein said secure token relates to the authorization of said user system to request said resource.

14. The method of claim 13, wherein said secure token included in said first domain's response to said redirect from said second domain is obfuscated.

15. The method of claim 13, wherein said secure token included in said first domain's response to said redirect from said second domain is encrypted.

16. The method of claim 13, further comprising: receiving a request from said second domain, wherein said request is to keep the state of the session between said user system and said first domain as active; determining whether said request made by said second domain contains said secure token; and if said secure token is present, and is valid, setting the state of the session between said first domain and said user system as active.

17. The method of claim 13, further comprising determining whether said request made by said user system is for a secure or a non-secure resource, and if said request is for a non-secure resource, including a secure token in said first domain's response to said redirect from said second domain authorizing fulfilling said request whether or not said user token is present.

18. A computer system for facilitating the sharing of data pertinent to a user system between a first domain and a second domain, wherein said second domain is in a session with said user system, comprising:

a module configured to establish a network session between said user system and said first domain, wherein said session is at least one of secure and non-secure;

a module configured to facilitate interactive communication between said first domain and said second domain;

a module configured to receive, on redirect from said second domain, a request made by said user system to said second domain for a resource, wherein access to said resource includes authorization by said first domain;

a module configured to substantially determine the presence of at least one user token in a cookie set by said first domain on said user system, wherein said user token originates with said first domain and relates at least to a log-on of said user system to said first domain;

a module configured to substantially determine the validity of said user token, if said user token is present;

if said user token is at least one of not present and not valid, said user system logging-on, and, upon valid log-on, setting a user token in a cookie on said user system, which token relates at least to said log-on; and if said user token is present, and is valid, a module configured to include a secure token in said first domain's response to said redirect from said second domain, wherein said secure token relates to the authorization of said user system to request said resource.

19. The system of claim 18, further comprising a module to obfuscate said secure token prior to inclusion in said first domain's response to said redirect from said second domain.

20. The system of claim 18, further comprising a module to encrypt said secure token prior to inclusion in said first domain's response to said redirect from said second domain.

21. The system of claim 18, further comprising:

a module to receive a request from said second domain, wherein said request is to keep the state of the session between said first domain and said user system as active;

a module to substantially determine whether said request contains said secure token; and if said secure token is present in said request, and said token is valid, setting the state of said session between said first domain and said user system as active.

22. A secure token comprising computer readable program code relating at least to the authorization of a user system in a session with a second domain, which session is one of secure or non-secure, to access a resource, wherein access to said resource includes authorization by a first domain, and wherein said computer readable program code derives from a secure token included by said first domain in a response to a redirect by said second domain of a request for said resource, which secure token is included in a cookie set by the second domain on the user system, and wherein said secure token is associated with a user token in a cookie set by said first domain on said user system at log-on to said first domain.

23. The secure token of claim 22, wherein said secure token is obfuscated by said first domain prior to inclusion in said first domain's response to said redirect from said second domain.

24. The secure token of claim 22, wherein said secure token is encrypted by said first domain prior to inclusion in said first domain's response to said redirect from said second domain.

25. A method for facilitating the sharing of data pertinent to a user system between a first domain and a second domain, wherein said second domain is in a session with said user system, the method comprising:

establishing a network session between said user system and said second domain, wherein said session is at least one of secure or non-secure, and wherein said second domain and said first domain are configured to interactively communicate with each other;

receiving a request from said user system to said second domain for a resource, wherein access to said resource includes authorization by said first domain;

requesting, by said second domain, authentication of said user session at said first domain;

determining the validity of said authentication, if said authentication is present;

redirecting said request to said first domain, if said authentication is not valid; and if said authentication is valid, using at least one secure token in a cookie set by the second domain to maintain the state of the session between said user system and said first domain as active.

* * * * *

UNITED STATES PATENT AND TRADEMARK OFFICE
CERTIFICATE OF CORRECTION

| | | |
|---|---|---|
| PATENT NO. | : 7,356,694 B2 | Page 1 of 1 |
| APPLICATION NO. | : 10/708543 | |
| DATED | : April 8, 2008 | |
| INVENTOR(S) | : Mary Ann Mayo et al. | |

It is certified that error appears in the above-identified patent and that said Letters Patent is hereby corrected as shown below:

On the Title page, Item (75) Inventors, please delete "Chandra C. Sekhar" and insert therefor
    --Chandra Sekhar Nallakukkala--.

Signed and Sealed this
Twenty-ninth Day of April, 2014

Michelle K. Lee
*Deputy Director of the United States Patent and Trademark Office*